(No Model.) 2 Sheets—Sheet 1.

F. W. POOL.
TRICYCLE.

No. 408,745. Patented Aug. 13, 1889.

Witnesses:
Albert Edgar Dondderow
Walter Lowrie Morgan

Inventor:
Francis Wright Pool (No Model.) 2 Sheets—Sheet 2.

F. W. POOL.
TRICYCLE.

No. 408,745. Patented Aug. 13, 1889.

Witnesses:
Albert Edgar Donaldson
Walter Lowrie Morgan

Inventor:
Francis Wright Pool

UNITED STATES PATENT OFFICE.

FRANCIS WRIGHT POOL, OF ST. PAUL, MINNESOTA.

TRICYCLE.

SPECIFICATION forming part of Letters Patent No. 408,745, dated August 13, 1889.

Application filed February 18, 1889. Serial No. 300,394. (No model.)

*To all whom it may concern:*

Be it known that I, FRANCIS WRIGHT POOL, salesman, of 20 College avenue, St. Paul, Ramsey county, State of Minnesota, have invented a new and Improved Tricycle, of which the following is a full, clear, and exact description.

My invention relates to improvements in tricycles, and is in particular an improvement on the traveling sleeve and its reciprocating mechanism described and claimed in my prior patent, dated January 29, 1889, Serial No. 396,892; and consists, generally, in the construction and combination hereinafter described, and particularly pointed out in the claims.

Figures 1, 3:
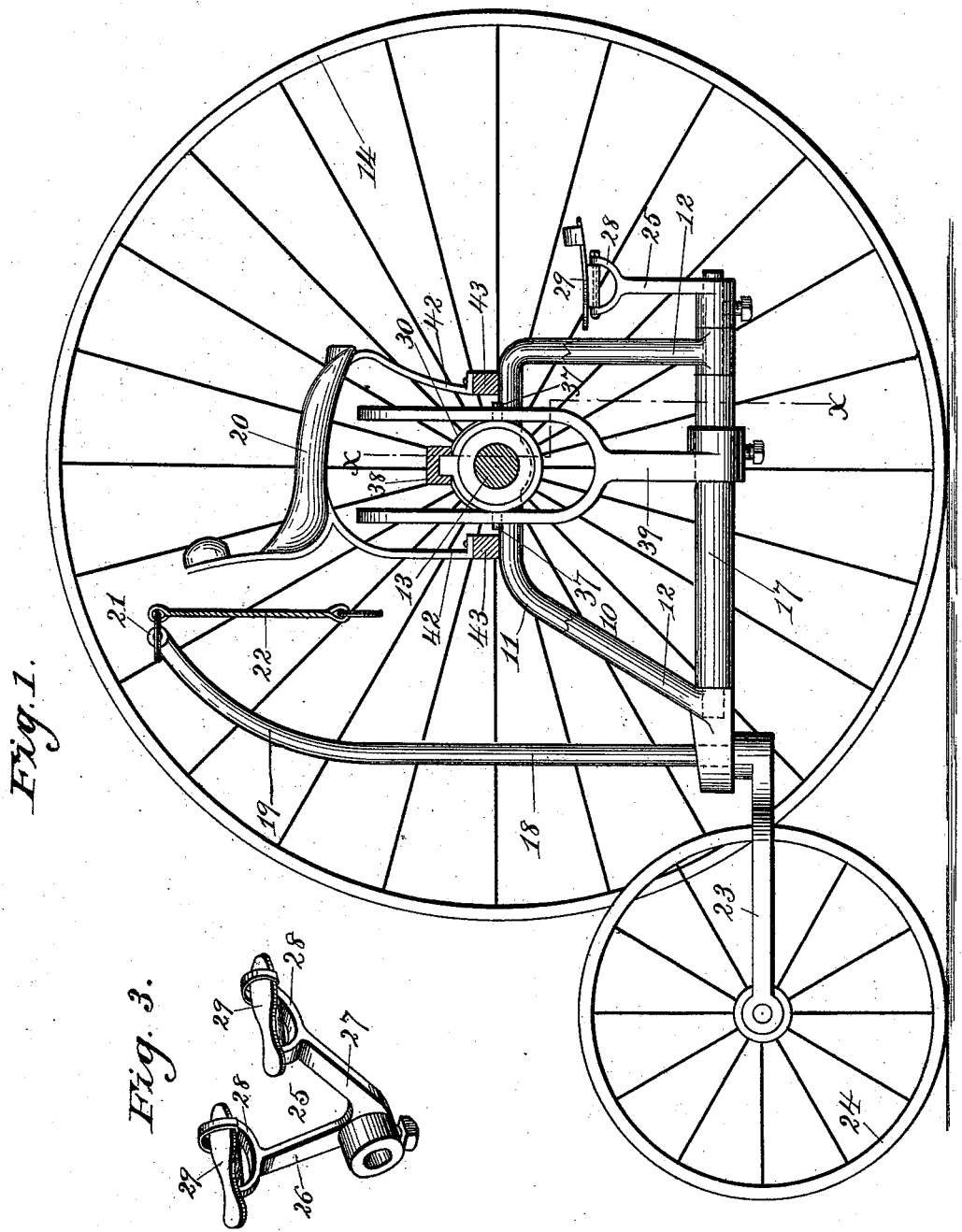
Figure 2:
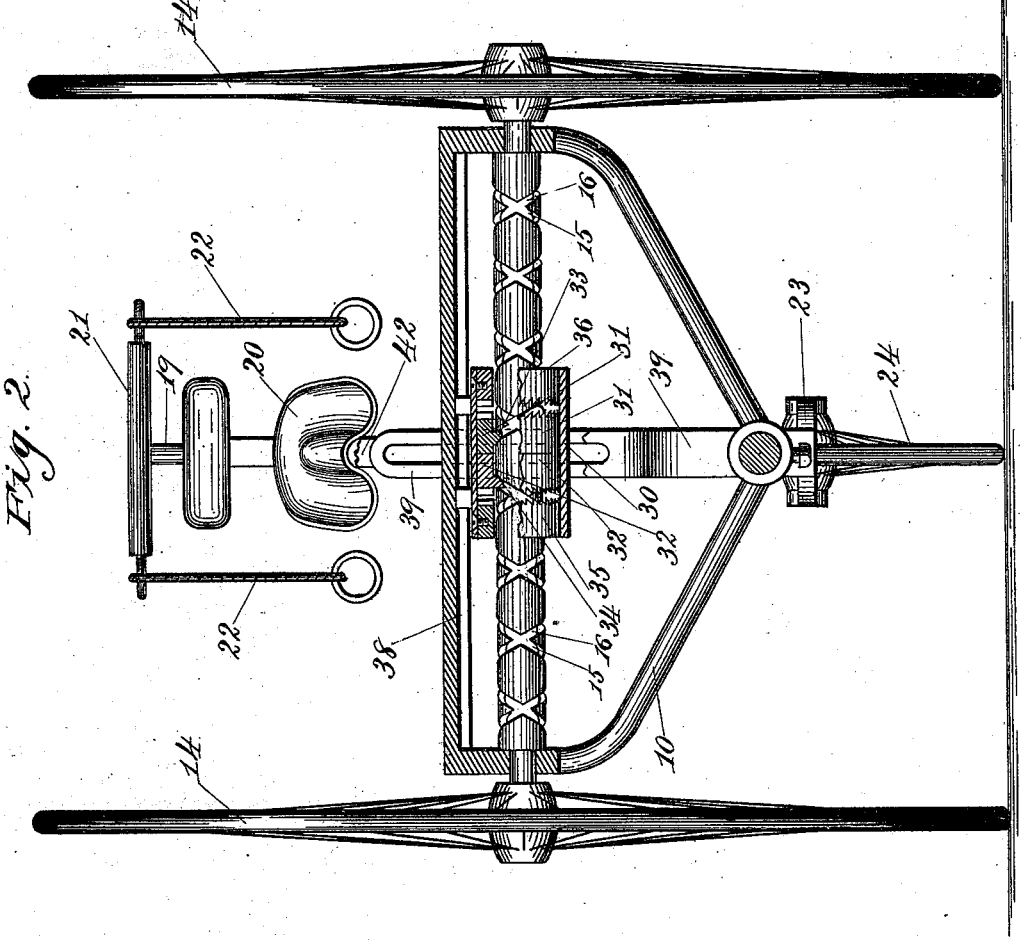

In the drawings, forming part of this specification, Figure 1 is a side elevation of my improved tricycle with one wheel removed. Fig. 2 is a cross-section of the same on line $x\,x$ of Fig. 1, and Fig. 3 is a perspective detail of the propelling cranks and pedals.

In the drawings, 10 represents the frame, consisting of two spaced side pieces 11, each provided with forward and rearward downwardly-extending arms 12, which arms are united upon a vertical line drawn centrally between the side pieces. In the side pieces of the frame an axle 13 is journaled, to each end of which a large wheel 14 is rigidly secured, the said axle being provided with continuous circumferential right and left spiral grooves 15 and 16, as best shown in Fig. 2. In the lower aligning ends of the frame 10 a rock-shaft 17 is journaled, extending from front to rear, or at right angles to the grooved axle 13. Through the lower end of the frame the vertical member of an angle-bar 18 is passed, adapted to turn therein, the said vertical member 19 constituting the steering-rod, and to that end is extended upward, preferably, above and to the rear of the seat 20, which latter is secured to cross-bars uniting the sides of the frame. The upper end of the steering-bar is provided with a T-handle 21, and to the extremities of said handles ropes or cords 22 are attached, adapted to be grasped by the occupant of the seat, as best shown in Fig. 2.

The horizontal member 23 of the angle-bar 18 is bifurcated to receive the small rear wheel 24. Upon the front projecting end of the rock-shaft 17 the pedal carrier 25 is securely fastened, consisting of a single casting or forging embracing two arms 26 and 27, radiating from an integral sleeve to essentially form a V, as best shown in Fig. 3.

The ends of the arms 26 and 27 are bifurcated, as shown at 28, and the pedals 29 are hinged thereto, the hinge-connection being effected by introducing a longitudinal sleeve attached to the under side of the pedals between the bifurcation of the arms and passing a bolt through said sleeve and bifurcated ends. The pedals are usually shaped to the contour of a shoe-sole, and are provided with toe-straps.

When the pedal-carrier is secured upon the rock-shaft, the arms of the former extend upward a convenient distance in direction of the seat, as shown in Fig. 1, and the seat 20 is preferably so mounted that the rider will sit immediately over the center of the axle and near thereto. The seat is preferably supported upon posts 42, secured to transverse braces 43, extending over each side of the axle parallel therewith and attached at their extremities to the upper portion of the frame 10.

A traveling sleeve 30 is held to slide upon the axle, consisting of a shell in which two abutting-rings 31 and 32 are loosely held, and the inner surface of each ring is provided with a spiral lug 33 and 34, respectively, the lug 33 traveling in the right-hand spiral groove of the axle, and the other lug 34 in the left-hand spiral groove of the axle, as best shown in Fig. 2. The outer edges of the rings 31 and 32 are toothed to engage the contiguous toothed surfaces of rings 35 and 36, rigidly held one at each end of the shell. The sleeve is also preferably provided with the pins 37, projecting horizontally outward from the center on each side and engaged by the slotted members of the vertical forked bar 39, which is rigidly secured to the rock-shaft 17. The rock-shaft when turned imparts its motion to the sleeve by means of said forked bar, whereby the sleeve is driven along the axle in the direction of the movement of the rock-shaft.

In order to prevent the turning of the sleeve on the axle, I prefer to provide it at each end with an upwardly-projecting lug engaged by and traveling in the groove of the guide-bar 38, which is arranged above and parallel with the axle, and is rigidly secured at each end to the side pieces 11.

In operation, when the rock-shaft is carried to the left by pressure upon the left-hand pedal, the slotted members of the vertical bar 39 press the pins 37 toward the left and carry the sleeve in the same direction. The fixed ring 35 meshes with the loose ring 32, causes the lug 34 of the latter to travel in the left-hand groove, turning the axle, and consequently the wheels fixed thereon. When the rock-shaft is turned to the right, the sleeve is driven to the right upon the axle, the ring 32 is released, and the opposing central ring 31 engages with the fixed ring 36, whereupon the lug 35, traveling in the right-hand groove, continues to revolve the axle in the same direction.

I desire it to be understood that although specific constructions have been described other equivalent constructions may be employed.

Having thus described my invention, what I claim as new, and desire to secure by Letters Patent, is—

1. In a tricycle having a right and left spirally-grooved axle, and a rock-shaft at right angles to said axle, provided with suitable pedals secured thereto, the combination, with a sleeve traveling upon the said axle having rings loosely held in the sleeve provided with lugs entering the grooves, of a grooved guide-bar arranged parallel with said axle and engaging lugs upon said sleeve, and a connection between the rock-shaft and sleeve, substantially as shown and described.

2. In a tricycle having a right and left spirally-grooved axle, and a rock-shaft at right angles to the axle, the combination of a sleeve reciprocating upon the axle provided with toothed rings centrally and loosely held within it having lugs entering the axle-grooves, and toothed rings secured to the sleeve adapted to engage said loose rings, and an upright forked bar secured to said rock-shaft and having its members slotted to engage with pins upon said sleeve, substantially as and for the purposes set forth.

FRANCIS WRIGHT POOL.

Witnesses:
WALTER LOWRIE MORGAN,
ALBERT EDGAR DONALDSON.